(12) United States Patent
Casto

(10) Patent No.: US 11,594,905 B2
(45) Date of Patent: Feb. 28, 2023

(54) PORTABLE POWER SOURCE

(71) Applicant: VCM Solutions Inc., Mississauga (CA)

(72) Inventor: Ven Casto, Mississauga (CA)

(73) Assignee: VCM Solutions Inc., Mississauga (CA)

( * ) Notice: Subject to any disclaimer, the term of this patent is extended or adjusted under 35 U.S.C. 154(b) by 0 days.

(21) Appl. No.: 17/498,493

(22) Filed: Oct. 11, 2021

(65) Prior Publication Data

US 2022/0115886 A1 Apr. 14, 2022

Related U.S. Application Data

(60) Provisional application No. 63/186,543, filed on May 10, 2021, provisional application No. 63/089,609, filed on Oct. 9, 2020.

(51) Int. Cl.
| | |
|---|---|
| *H02J 9/06* | (2006.01) |
| *H02J 7/00* | (2006.01) |
| *H02J 7/34* | (2006.01) |
| *H01M 50/207* | (2021.01) |
| *H02M 7/538* | (2007.01) |

(52) U.S. Cl.
CPC ......... *H02J 7/0063* (2013.01); *H01M 50/207* (2021.01); *H02J 7/342* (2020.01); *H02J 9/062* (2013.01); *H02M 7/53803* (2013.01); *H02J 2207/20* (2020.01)

(58) Field of Classification Search
CPC .......... H02J 7/0063; H02J 7/342; H02J 9/062; H02J 2207/20; H02J 7/0042; H01M 50/207; H02M 7/53803; Y02E 60/10
USPC .......................................................... 307/64
See application file for complete search history.

(56) References Cited

U.S. PATENT DOCUMENTS

2021/0083505 A1* 3/2021 Beaston .................. H02J 3/381

* cited by examiner

*Primary Examiner* — Richard Tan
(74) *Attorney, Agent, or Firm* — Head, Johnson, Kachigian & Wilkinson, PC

(57) ABSTRACT

An apparatus for defining an AC power source having a predetermined amperage rating and for use with a pallet truck or fork lift lifting device. The apparatus includes a pair of terminal banks, a battery, a converter adapted to change DC to AC power, a relay, a controller, and a base adapted for engagement by the lifting device for transport of the apparatus. The apparatus is shaped so that it can be transported by the lifting device through a doorway. A pair of terminal banks, battery, converter, relay and controller are coupled to one another and configured for selective operation in a standalone configuration or a stacked configuration.

12 Claims, 7 Drawing Sheets

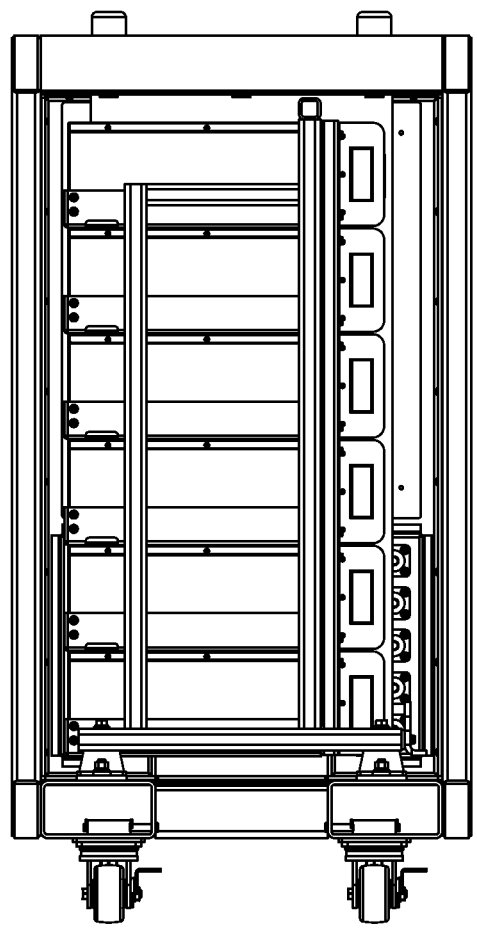
FIG.4
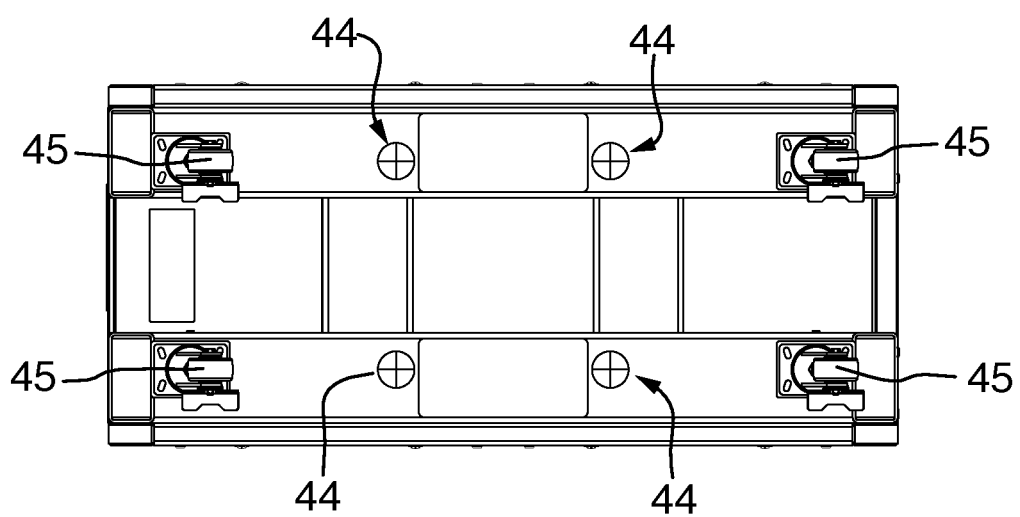
FIG.4.1

Standalone configuration
island mode

Stacked configuration
island mode

Standalone configuration
coupled mode

PORTABLE POWER SOURCE

CROSS-REFERENCE TO RELATED APPLICATIONS

This application claims priority to U.S. Provisional Patent Application Ser. No. 63/089,609, filed Oct. 9, 2020, and U.S. Provisional Patent Application Ser. No. 63/186,543, filed May 10, 2021.

BACKGROUND OF THE INVENTION

1. Field of the Invention

The invention relates to the field of portable power supply.

2. Prior Art

Portable generators are commonly used to provide temporary electrical power. For example, only, generators are often used at construction sites and at concerts.

SUMMARY OF THE INVENTION

Forming one aspect of the invention is apparatus for defining an AC power source having a predetermined amperage rating and for use with a lifting device selected from the group consisting of pallet truck and fork lift.

The apparatus comprises: a pair of terminal banks; a battery; a converter adapted to change DC power to AC power; a relay; a controller; and a base; and a shape.

The converter is adapted to change DC power to AC power.

The base is adapted for engagement by the lifting device for transport of the apparatus.

The shape is such that the apparatus can be transported by the lifting device through a doorway that is 32" wide and 80" high.

The pair of terminal banks, battery, converter, relay and controller are operatively coupled to one another and configured for selective operation in one of a standalone configuration and a stacked configuration.

In the standalone configuration, one of the pair of terminal banks defines an AC power supply using AC power generated by the converter and the other of the pair of terminal banks is isolated from the converter.

In the stacked configuration, one of the pair of terminal banks is coupled to an external AC power supply and the other of the pair of terminal banks defines an AC power supply using AC power both generated by the converter and provided by the external AC power supply and having a load capacity equal to the maximum of: (i) the combined load capacity of the external AC power supply and the converter; and (ii) the predetermined amperage rating.

According to another aspect, the pair of terminal banks, battery, converter, relay and controller can be operatively coupled to one another and configured, when coupled to an external load and in each of the standalone configuration and the stacked configuration, for selective operation in one of:
 a coupled mode, wherein the waveform of the AC power produced by the converter
 is synchronized by the controller responsive to the external load; and
 an island mode, wherein the waveform produced is independent of the external load According to another aspect, the apparatus can be adapted to permit a plurality of the apparatus to be coupled to one another in a power array wherein
 one of the plurality is a master and is coupled to an external load, the master operating in the stacked configuration and receiving power from the one or more other apparatus of the plurality of the power array; and
 the one or more other apparatus of the plurality of the power array are slaves, each being connected to one other of the apparatus of the plurality to deliver power thereto and operating in the coupled mode, the one other of the apparatus of the plurality to which said each is connected defining the external load to which the waveform is synchronized.

According to another aspect, the master can be adapted for selective operation in one of the coupled mode and the island mode.

According to another aspect, the converter can include a rectifier and the apparatus can be further adapted to permit a plurality of the apparatus to be coupled to one another in a charging array wherein: one of the plurality of the charging array is coupled to an external AC power supply; the others of the plurality of the charging array receive AC power from the one.

According to another aspect, the apparatus can form part of a system also comprising cables and cable shrouds, each cable being rated for the predetermined amperage rating and adapted to provide for the apparatus forming the power array to be coupled to one another to form the power array and the shrouds adapted to protect cords from lightweight traffic when traversing traffic corridors.

According to another aspect, the plurality of apparatus forming the power array can be user selectable between 2 and 8.

According to another aspect, each apparatus can: have a unique identifier; have a functionality to permit user entry of a unique identifier; have an ADD SLAVE TO STACK functionality to enable the addition of a slave to a master; and be adapted to permit assembly into a 2-unit power array by following the following steps:
 operatively connecting the input terminals of an apparatus to be master to the output terminals of an apparatus to be slaved;
 selecting the ADD SLAVE TO STACK functionality on the apparatus to be master; and entering the unique identifier of the apparatus to be slaved.

According to another aspect, each apparatus can be adapted to permit slaves to be added to a power array by following the following steps:
 operatively connecting the output terminals of an apparatus to be added as slave to the input terminals of the last slave in the array;
 selecting the ADD SLAVE TO STACK functionality on the apparatus to be master; and entering the unique identifier of the apparatus to be slaved.

According to another aspect, each apparatus can have a functionality to REMOVE SLAVE FROM STACK functionality to enable the removal of a slave to a stack and is adapted to permit slaves to be removed from a power array by following the following steps:
 selecting the REMOVE SLAVE FROM STACK FUNCTIONALITY on the Master; and disconnecting the output terminals of the last slave in the array.

According to another aspect, each apparatus can be adapted such that, the REMOVE SLAVE FROM STACK functionality is enabled only in respect of a Master in an array, and such that the ADD SLAVE TO STACK is disabled in respect of any slave in an array.

According to another aspect, each apparatus can be adapted such that the ADD SLAVE TO STACK is disabled in respect of a Master when the additional of a further apparatus to the array would result in the combined load capacities of the apparatus in the array exceeding the predetermined amperage rating.

Advantages, features and characteristics of the invention will become evident upon review of the following detailed description with reference to the appended drawings, the latter being briefly described hereinbelow.

BRIEF DESCRIPTION OF THE DRAWINGS

FIG. 4 is a rear X-ray view of the apparatus of FIG. 1;

FIG. 4.1 is a bottom view of the apparatus of FIG. 1;

DETAILED DESCRIPTION OF THE PREFERRED EMBODIMENTS

Figure 1:
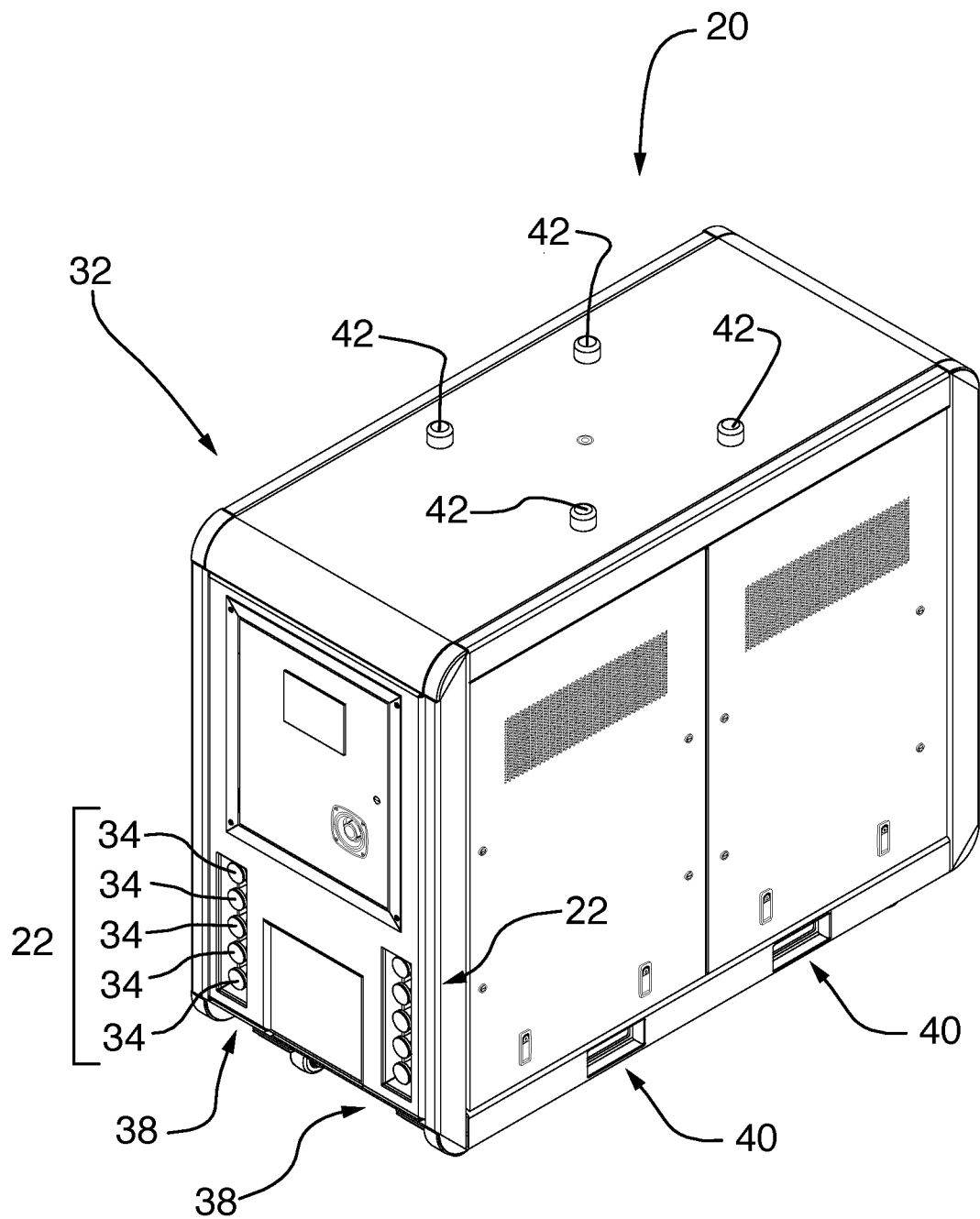
FIG. 1 is a front, top, right side view of apparatus according to an example embodiment of the invention.
Figure 2:
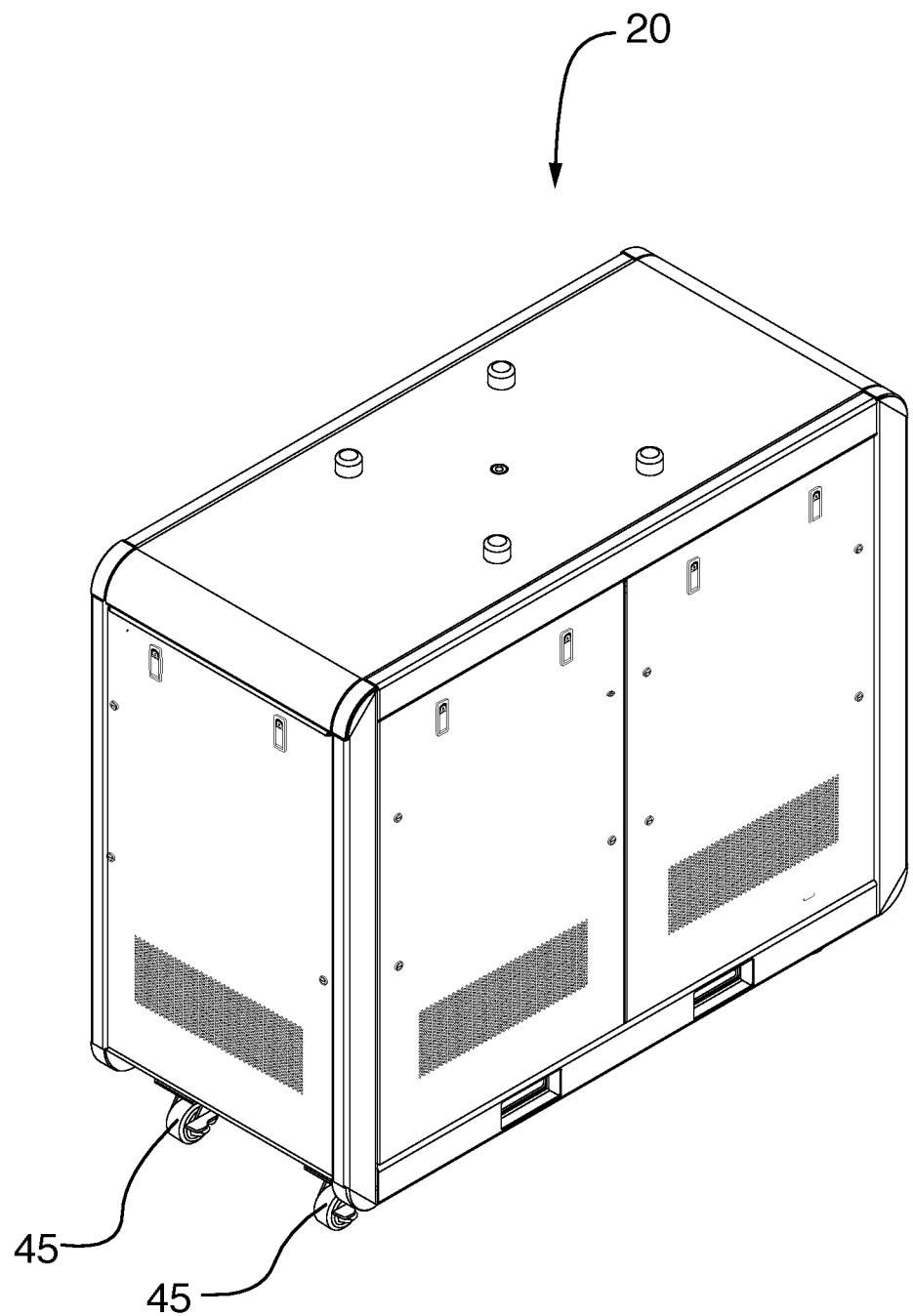
FIG. 2 is a front, rear, left side view of the apparatus of FIG. 1.
Figure 3:
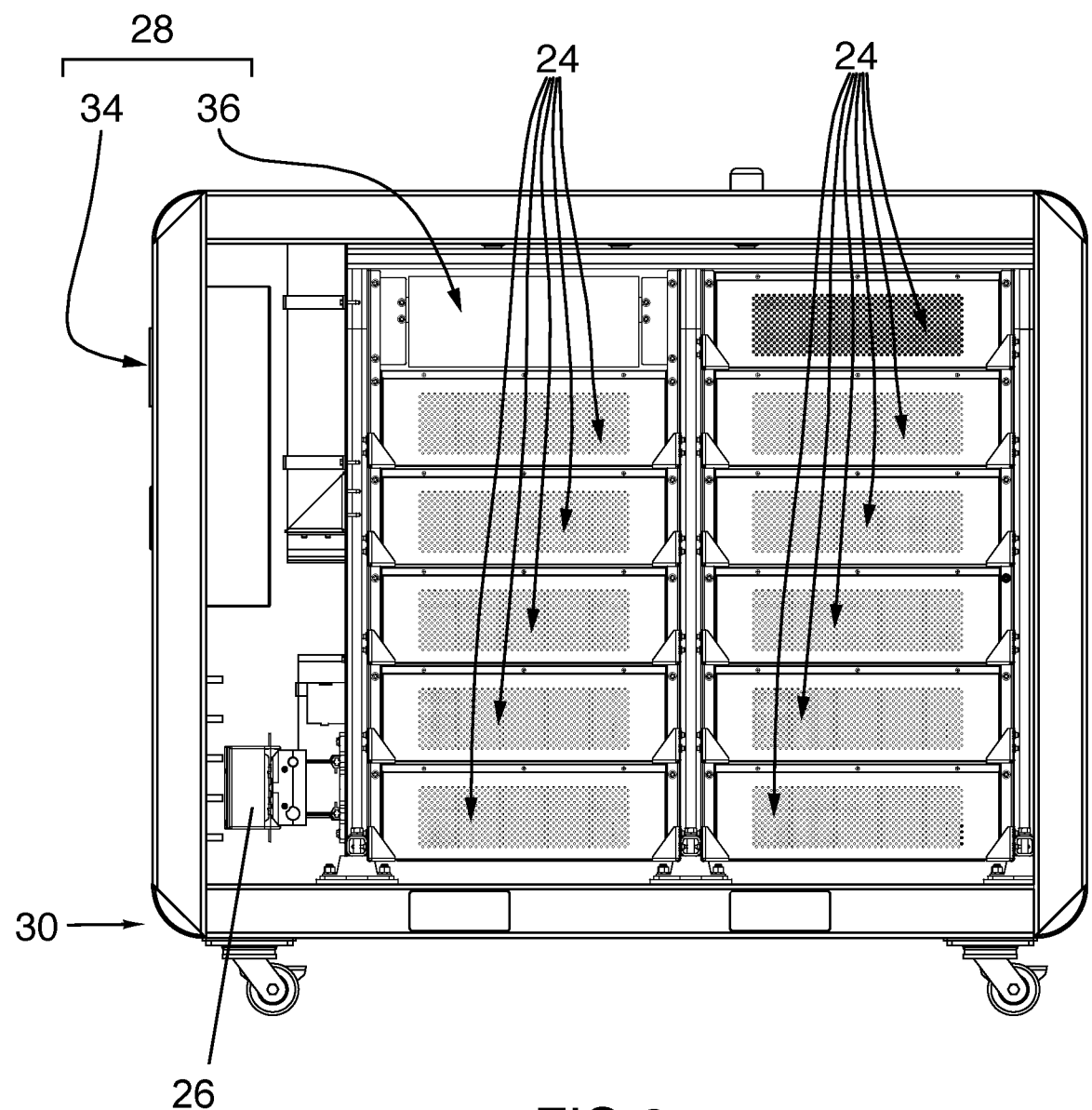
FIG. 3 is a side X-ray view of the apparatus of FIG. 1.

A non-limiting example of apparatus 20 according to the invention is shown in FIG. 1 through FIG. 4.1 and will be understood to have: a pair of terminal banks 22; a battery 24; a relay 26; a controller 28; a base 30; and a shape 32.

Each terminal bank includes five connectors 34 of the Cam-Lok style: three of those connectors are each associated with one power phase, one is associated with neutral and one with ground.

The battery is a plurality (11) cells collectively storing 50 KWH of usable DC power (LiFePO4 52V 100 Ahr modules)

The converter is a BiDirectional Power Conversion System (PCS) including a 40KW/50A inverter and a 40KW/50A rectifier.

The relay is coupled to selectively isolate one of the terminal banks.

The controller is operatively coupled to the converter, battery, relay and terminal banks and includes a Touch Screen 34 and a Programmable Logic Controller 36. The controller is further described in subsequent paragraphs.

The base has a pair of longitudinal extending fork cavities 38 and a pair of laterally extending fork cavities 40 and is thereby adapted for engagement (not shown) by a lifting device selected from the group consisting of pallet truck and fork lift.

The shape is generally rectangular with a width of 32", a high of 63.5" and a length of 70", thereby to permit the apparatus to be transported by a fork lift or pallet truck through a conventional 36" wide and 80" high industrial doorway (not shown).

A notable departure from the rectangular profile are four upwardly projecting studs 42 at the top of the apparatus, four sockets 44 defined in the underside of the apparatus and four casters 45 on the underside of the apparatus.

Figure 5:
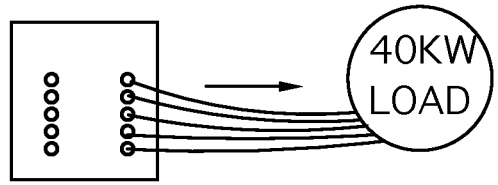
FIG. 5 is a schematic view of the apparatus of FIG. 1 in use with a 40 KW load.
Figure 6:
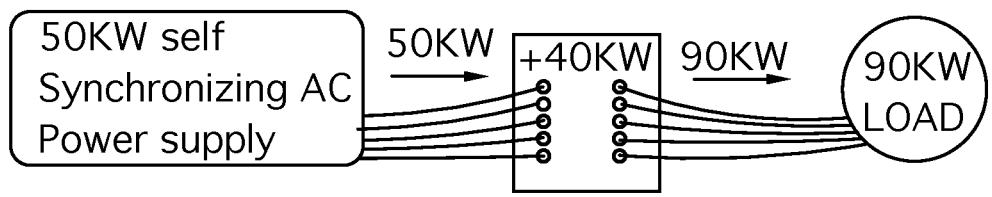
FIG. 6 is a schematic view of the apparatus of FIG. 1 in use with an external AC power supply and a 90 KW load.

The terminal banks, battery, converter, relay and controller will be understood to be operatively coupled to one another and configured for selective operation in one of a standalone configuration shown schematically in FIG. 5 and a stacked configuration shown schematically in FIG. 6

As seen in FIG. 5, in the standalone configuration, one of the pair of terminal banks defines an AC power supply using AC power generated by the converter and the other of the pair of terminal banks is isolated from the converter.

As seen in FIG. 6, in the stacked configuration, one of the pair of terminal banks is coupled to an external AC power supply and the other of the pair of terminal banks defines an AC power supply using AC power both generated by the converter and provided by the external AC power supply and having a load capacity equal to the maximum of: (a) the combined load capacity of the external AC power supply and the converter; and (b) a predetermined amperage rating of 400A, this being defined by the relay and the internal bus of the apparatus.

The pair of terminal banks, battery, converter, relay and controller are operatively coupled to one another and configured when coupled to an external load and in each of the standalone configuration and the stacked configuration, for selective operation in one of:

a coupled mode, wherein the waveform of the AC power produced by the converter is synchronized by the controller responsive to the external load; and an island mode, wherein the waveform produced is independent of the external load.

In this regard, it will be evident that, in the standalone configuration of FIG. 5, the apparatus is in the island mode, since it is simply serving as a power supply to a simple 40 KW load.

It will further be evident that, in the stacked configuration of FIG. 6, the standalone apparatus is again in the island mode, since it is serving as a power supply to a simple 90KW load.

Figure 7:
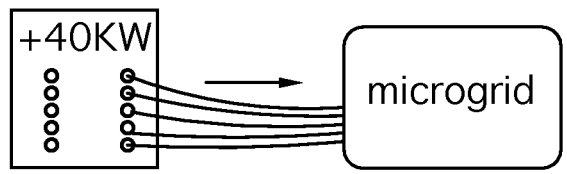
FIG. 7 is a schematic view of the apparatus of FIG. 1 in use with a microgrid.
Figures 8, 9, 10:
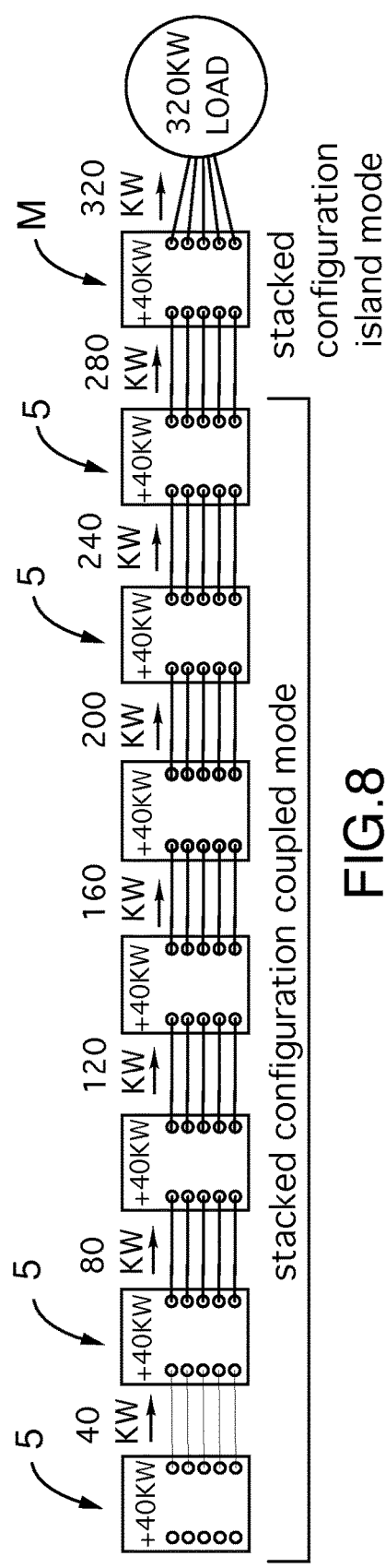
FIG. 8 is a schematic view of a plurality of the apparatus of FIG. 1 in use with a 320 KW load.
FIG. 9 is a schematic view of a plurality of the apparatus of FIG. 1 in use with a microgrid.
FIG. 10 is a schematic view of the structure of FIG. 9 being charged.

However, a further example of the standalone configuration is shown in FIG. 7; in this example, the apparatus is in the coupled mode, since it is delivering power to a microgrid and thus must synchronize therewith. Similarly, further examples of the apparatus in the stacked configuration and coupled mode are shown in FIG. 8 and FIG. 9.

These figures evidence further functionality of the apparatus, namely, the use of a plurality of the apparatus in power arrays.

Each power array shown is characterized by a master M and one or more slaves S.

Each of the slaves is connected to one other of the apparatus of the plurality to deliver power thereto and always operate in the coupled mode, the one other of the apparatus of the plurality to which said each is connected defining the external load to which the waveform is synchronized.

The master is that coupled to the external load, operates in the stacked configuration, receives power from the one or more slaves of the plurality and is adapted for selective operation in the coupled mode, when the load is a microgrid, and in the island mode, when the load is a simple load.

Controller

The controller is adapted such that each apparatus:
has a unique identifier;
has a functionality to permit user entry of a unique identifier using the touchscreen;
has an ADD SLAVE TO STACK functionality actuable by the touchscreen to enable the addition of a slave to a master, the ADD SLAVE TO STACK being disabled in respect of any slave in an array and further being automatically disabled in respect of a Master when the additional of a further apparatus to the array would result in the combined load capacities of the apparatus in the array exceeding the predetermined amperage rating.
has an REMOVE SLAVE FROM STACK functionality actuable from the touchscreen to enable the removal of a slave from a master, this functionality only being enabled in respect of a Master in an array.

According to another aspect, each apparatus can be adapted such that the controller enables the apparatus to permit
user assembly of two apparatus into a 2-unit power array by following the following steps:
operatively connecting the input terminals of an apparatus to be master to the output terminals of an apparatus to be slaved;
selecting the ADD SLAVE TO STACK functionality on the apparatus to be master; and entering the unique identifier of the apparatus to be slaved.
users addition of a slave to an array by following the following steps:
operatively connecting the output terminals of an apparatus to be added as slave to the input terminals of the last slave in the array;
selecting the ADD SLAVE TO STACK functionality on the apparatus to be master; and entering the unique identifier of the apparatus to be slaved.
user removal of a slave from an array by following the following steps:
selecting the REMOVE SLAVE FROM STACK FUNCTIONALITY on the Master; and
disconnecting the output terminals of the last slave in the array.

Persons of ordinary skill will readily appreciate the advantage of the apparatus and system in that it renders it relatively easy to provide for temporary silent electrical power in a scalable manner without the need for labor skilled in the field of electrical circuitry design. The laborers are merely required to:
transport the apparatus to the desired location using whatever combination of fork lift, pallet lifter or casters is most appropriate (where space is at a premium, the apparatus can be stacked two high, with the studs and sockets providing for a secure arrangement)
plug the apparatus together using the cables and convenient cam-lock connectors;
as appropriate, fit the cables in the shrouds;
follow the simple computer prompted processes described above.

Of course, whereas the present disclosure is directed to the delivery of power, the apparatus can of course be charged individually (not shown) or as part of a charging array as shown in FIG. 10, wherein one of the plurality of the charging array is coupled to an external AC power supply and the others of the plurality of the charging array receive power from the one: the supplied AC will be converted to DC by the rectifiers.

Figure 11:
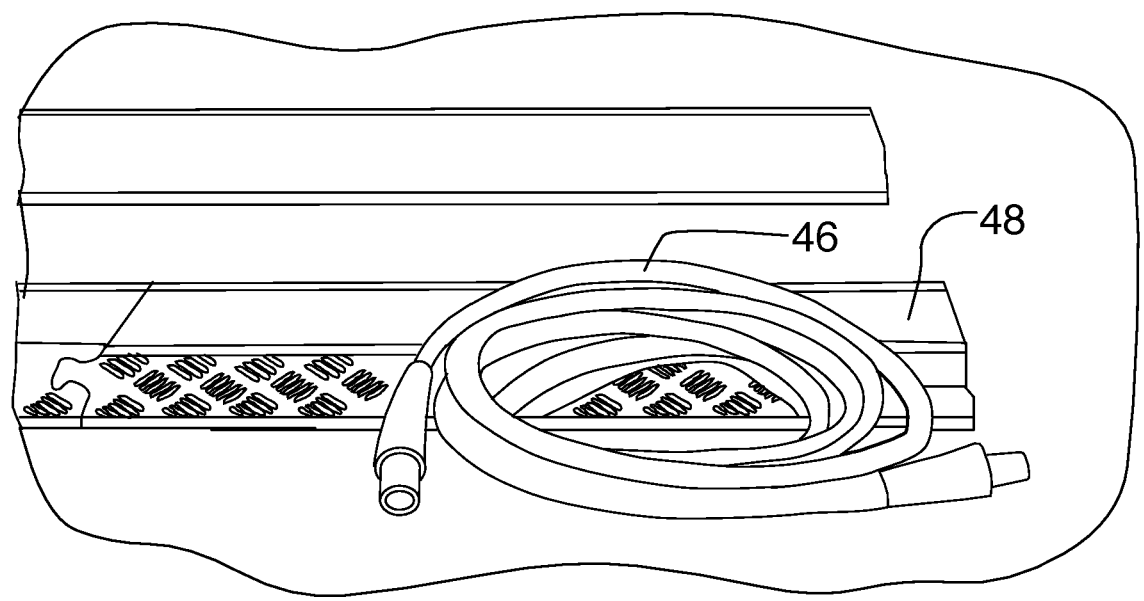
FIG. 11 is a view of components which, together with the apparatus, form part of an example system.
Figure 12:
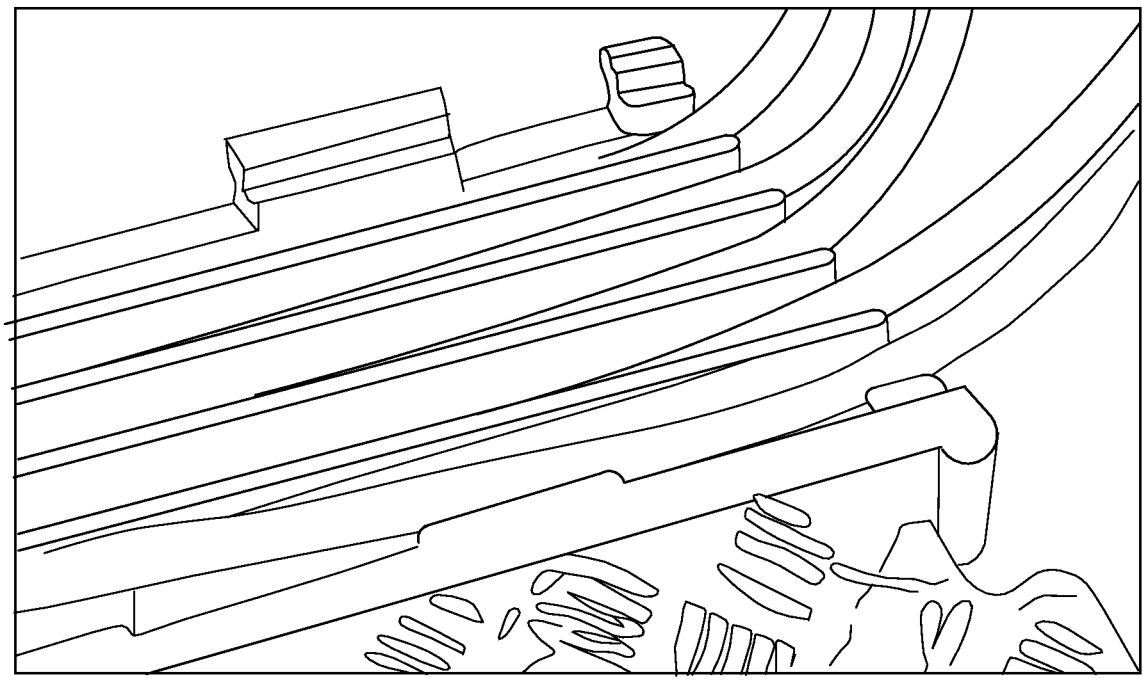
FIG. 12 is a view of the structure of FIG. 11 in use.

According to another example embodiment of the invention, the apparatus can form part of a system which includes cables 46 and cable shrouds 48 as shown in FIGS. 11 and 12, the cables each being rated for the predetermined amperage rating and adapted to provide for the apparatus forming the power array to be coupled to one another to form the power array, the shrouds adapted to protect cords from lightweight traffic when traversing traffic corridors.

Whereas in the figures, the array shows eight of the apparatus, it will be appreciated that arrays using the apparatus described can be constructed using as few as two and as many as 128 units. [1 master can control up to 127 slaves, limited to 400 amp per daisy-chain run which can be paralleled together through a distribution panel/similar to a max of 6,400 amps (128×7™ at 50-amp output) controlled by one Master.]

Further, whereas a self-synchronizing AC power supply is shown in FIG. 6, the apparatus can be deployed in the arrangement of FIG. 6 with a simple AC generator; the PCS would sense the waveform differential and adjust itself to match.

Of course, variation is possible. Arrays of any number of apparatus could be produced, with suitable modification to the relays, internal buses and controllers. Similarly, whereas each apparatus is indicated to have a capacity of 40 KW and 50 A, this could vary with suitable modification to the battery, converter and controller.

Yet further variations are possible. Accordingly, the invention should be understood to be limited only by the accompanying claims, purposively construed.

What is claimed is:

1. Apparatus for defining an AC power source having a predetermined amperage rating and for use with a lifting device selected from the group consisting of pallet truck and fork lift, the apparatus comprising:
a pair of terminal banks;
a battery;
a converter adapted to change DC power to AC power;
a relay;
a controller; and
a base adapted for engagement by the lifting device for transport of the apparatus, the apparatus having a shape adapted such that the apparatus can be transported by the lifting device through a doorway that is 32" wide and 80" high;
the pair of terminal banks, battery, converter, relay and controller being operatively coupled to one another and configured for selective operation in one of
a standalone configuration, wherein one of the pair of terminal banks defines an AC power supply using AC power generated by the converter and the other of the pair of terminal banks is isolated from the converter; and
a stacked configuration, wherein one of the pair of terminal banks is coupled to an external AC power supply and the other of the pair of terminal banks defines an AC power supply using AC power both generated by the converter and provided by the external AC power supply and having a load capacity equal to the maximum of:
combined load capacity of the external AC power supply and the converter; and
the predetermined amperage rating.

2. The apparatus according to claim 1, wherein the pair of terminal banks, battery, converter, relay and controller are operatively coupled to one another and configured, when coupled to an external load and in each of the standalone and stacked configuration, for selective operation in one of
- a coupled mode, wherein a waveform of the AC power produced by the converter is synchronized by the controller responsive to the external load; and
- an island mode, wherein the waveform produced is independent of the external load.

3. The apparatus according to claim 2, adapted to permit a plurality of the apparatus to be coupled to one another in a power array wherein one of the plurality of the apparatus is a master and is coupled to the external load, the master operating in the stacked configuration and receiving power from the one or more other apparatus of the plurality of the apparatus in the power array; and the one or more other apparatus of the plurality of the apparatus in the power array are slaves, each being connected to one other of the apparatus of the plurality of the apparatus to deliver power thereto and operating in the coupled mode, the one other of the apparatus of the plurality of the apparatus to which said each is connected defining the external load to which the waveform is synchronized.

4. The apparatus according to claim 3, wherein the master is adapted for selective operation in one of the coupled mode and the island mode.

5. The apparatus according to claim 4, where each apparatus has a unique identifier, has a functionality to permit an entry of the unique identifier, has an ADD SLAVE TO STACK functionality to enable an addition of a slave to a stack and is adapted to permit assembly into a two units power array by the following steps:
- operatively connecting input terminals of an apparatus to be master to output terminals of an apparatus to be slaved;
- selecting the ADD SLAVE TO STACK functionality on the apparatus to be master; and
- entering the unique identifier of the apparatus to be slaved.

6. The apparatus according to claim 5, where each apparatus is adapted to permit slaves to be added to the power array by the following steps:
- operatively connecting output terminals of an apparatus to be added as slave to input terminals of last slave in the power array;
- selecting the ADD SLAVE TO STACK functionality on the apparatus to be master; and
- entering the unique identifier of the apparatus to be slaved.

7. The apparatus according to claim 6, where each apparatus has a functionality to REMOVE SLAVE FROM STACK functionality to enable removal of a slave from the stack and is adapted to permit slaves to be removed from the power array by the following steps:
- selecting the REMOVE SLAVE FROM STACK functionality on the master; and
- disconnecting output terminals of the last slave in the power array.

8. The apparatus according to claim 7, adapted such that, the REMOVE SLAVE FROM STACK functionality is enabled only in respect of the master in the power array, and such that the ADD SLAVE TO STACK functionality is disabled in respect of any slave in the power array.

9. The apparatus according to claim 8, wherein the ADD SLAVE TO STACK functionality is disabled in respect of the master when an additional of a further apparatus to the power array would result in combined load capacities of the apparatus in the power array exceeding the predetermined amperage rating.

10. The apparatus according to claim 4, wherein the converter includes a rectifier and the apparatus is further adapted to permit a plurality of the apparatus to be coupled to one another in a charging array wherein the charging array is coupled to the external AC power supply.

11. A system comprising:
- the apparatus according to claim 9; and
- cables each rated for the predetermined amperage rating and adapted to provide for the apparatus forming the power array to be coupled to one another to form the power array.

12. The system according to 11, wherein the plurality of the apparatus forming the power array is user selectable between 2 and 8.

* * * * *